(12) United States Patent
Mikami

(10) Patent No.: US 8,443,874 B2
(45) Date of Patent: May 21, 2013

(54) HEAT DISSIPATING STRUCTURE AND PORTABLE PHONE

(75) Inventor: Nobuhiro Mikami, Tokyo (JP)

(73) Assignee: NEC Corporation, Tokyo (JP)

( * ) Notice: Subject to any disclaimer, the term of this patent is extended or adjusted under 35 U.S.C. 154(b) by 759 days.

(21) Appl. No.: 12/593,434

(22) PCT Filed: Jan. 28, 2008

(86) PCT No.: PCT/JP2008/051154
§ 371 (c)(1), (2), (4) Date: Dec. 7, 2009

(87) PCT Pub. No.: WO2008/126444
PCT Pub. Date: Oct. 23, 2008

(65) Prior Publication Data
US 2010/0126708 A1 May 27, 2010

(30) Foreign Application Priority Data
Mar. 30, 2007 (JP) .................... 2007-090815

(51) Int. Cl.
*F28F 27/00* (2006.01)
*F28D 17/00* (2006.01)
*F28D 19/00* (2006.01)

(52) U.S. Cl.
USPC ........... 165/276; 165/10; 165/80.1; 165/80.2; 165/185; 165/277

(58) Field of Classification Search
USPC .................. 165/10, 80.1, 80.2, 185, 276, 277
See application file for complete search history.

(56) References Cited

U.S. PATENT DOCUMENTS

| 3,229,755 A | * | 1/1966 | Komarow ...................... 165/277 |
| 3,372,737 A | * | 3/1968 | Schnell ......................... 165/277 |
| 3,390,717 A | * | 7/1968 | Townsend ..................... 165/277 |
| 3,478,819 A | * | 11/1969 | Reinke ........................... 165/277 |
| 4,212,346 A | * | 7/1980 | Boyd ............................. 165/277 |
| 4,676,300 A | * | 6/1987 | Miyazaki ...................... 165/276 |
| 6,202,739 B1 | * | 3/2001 | Pal et al. .................. 165/104.33 |
| 6,260,613 B1 | * | 7/2001 | Pollard, II ..................... 165/185 |
| 7,755,899 B2 | * | 7/2010 | Stenmark ....................... 361/710 |
| 2006/0141308 A1 | * | 6/2006 | Becerra et al. .................. 429/24 |
| 2006/0198101 A1 | * | 9/2006 | Cho ............................. 361/687 |

FOREIGN PATENT DOCUMENTS

| JP | 62-73595 A | 5/1987 |
| JP | 2-73788 A | 6/1990 |
| JP | 4-25290 A | 2/1992 |
| JP | 4-34743 A | 3/1992 |

(Continued)

OTHER PUBLICATIONS

International Search Report for PCT/JP2008/051154 mailed Mar. 18, 2008.

*Primary Examiner* — Ljiljana Ciric

(57) ABSTRACT

A heat dissipating structure and a portable device are provided, which enable that heat is dissipated from a heat generating part without causing a user to feel discomfort. A heat transfer member is configured to transfer heat generated in a heat generating body and a thermal storrage unit is thermally connected to the heat transfer member. The thermal storrage unit includes a pack with stretching property and a thermal storrage medium which is filled in the pack and a volume of which changes with a change in temperature. The pack is arranged such that there is a gap between the pack and a first heat dissipating portion at normal temperature and the pack contacts the first heat dissipating portion when the thermal storrage medium expands with a change in temperature.

10 Claims, 4 Drawing Sheets

FOREIGN PATENT DOCUMENTS

| | | |
|---|---|---|
| JP | 7-221479 A | 8/1995 |
| JP | 11-202979 A | 7/1999 |
| JP | 11-312883 A | 11/1999 |
| JP | 2001274580 A | 10/2001 |
| JP | 2002124224 A | 4/2002 |
| JP | 2003142864 A | 5/2003 |
| JP | 2004152895 A | 5/2004 |
| JP | 2006100564 A | 4/2006 |
| JP | 3125565 B | 9/2006 |
| WO | WO 2007084070 A1 * | 7/2007 |

* cited by examiner

HEAT DISSIPATING STRUCTURE AND PORTABLE PHONE

The present application is the National Phase of PCT/JP2008/051154, filed Jan. 28, 2008, which is based upon and claims the benefit of priority from Japanese Patent Application No. 2007-090815. The disclosure of the patent application is incorporated herein in its entirely by reference.

TECHNICAL FIELD

The present invention relates to a heat dissipating structure for dissipating heat generated in a heat generating part, and particularly relates to a heat dissipating structure for dissipating heat generated in a heat generating part arranged in an enclosure of a portable phone.

BACKGROUND ART

In resent years, multifunction and miniaturization have been advanced for portable devices such as portable phones. Semiconductor chips are arranged with high density in an enclosure of a miniaturized portable phone. A gap between the enclosure and the semiconductor chips is getting narrower. As a result, heat generated in the semiconductor chips or the like is immediately transferred to the enclosure.

The transfer of the heat generated in the semiconductor chips to the enclosure causes a rise of the temperature of the enclosure. Therefore, a heat dissipating structure is proposed to prevent high temperature of the enclosure.

As such heat dissipating structure, there are known techniques for suppressing a rapid rise in temperature, in which a shape memory alloy member or the like connected to a heat generating body is deformed to contact a heat. dissipating member (e.g. Japanese Laid Open Utility Model Application (JP-U-Heisei 2-73788), Japanese Laid Open Utility Model Application (JP-U-Heisei 4-25290), Japanese Laid Open Utility Model Application (JP-U-Showa 62-73595), Japanese Laid Open Utility Model Application (JP-U-Heisei 4-34743), and Japanese Laid Open Patent Application (JP-P2002-124224A)).

Furthermore, as another heat dissipating structure, there are techniques using thermal storrage medium which changes from solid to liquid (Japanese Laid Open Patent Application (JP-P2004-152895A), Japanese Laid Open Patent Application (JP-P2006-100564A), Japanese Laid Open Patent Application (JP-P2001-274580A), Japanese Laid Open Patent Application (JP-A-Heisei 11-202979), and Japanese Laid Open Patent Application (JP-P2003-142864A)). Furthermore, Japanese Utility Model Registration No. 3125565 discloses a material of such thermal storrage medium.

Disclosures in Japanese Laid Open Patent Application (JP-P2004-152895A) and Japanese Laid Open Patent Application (JP-P2006-100564A) out of these documents will be explained below.

FIG. 1 shows a heat dissipating structure disclosed in Japanese Laid Open Patent Application (JP-P 2004-152895A). This heat dissipating structure includes a plurality of heat generating bodies 102 mounted on a board 101, a sheet-like heat transfer member 104 arranged in close contact with the surfaces of the plurality of semiconductor chips 102, and a heat absorbing member 103 arranged in close contact with the surface of the heat transfer member 104 and configured to absorb heat transferred from the heat generating bodies 102 to the sheet-like heat transfer member by changing from solid phase to liquid phase. It is described that the heat dissipating structure is applied to a portable phone as shown in FIG. 2.

According to the heat dissipating structure, temperatures of the plurality of the heat generating bodies 102 can be leveled and the heat generated in the heat generating bodies can be absorbed by the heat absorbing member.

However, according to the structure, since most of heat generated in the heat generating bodies is absorbed by the heat absorbing member, heat absorption by the heart absorbing member easily reaches saturation. Moreover, once the heat absorption by the heat absorbing member reaches saturation, heat absorbed in the heat absorbing member is dissipated from a heat dissipating portion such as an enclosure for a long time even after the heat generating bodies stop generating heat. Consequently, a user feels discomfort.

FIG. 3 shows a heat dissipating structure disclosed in Japanese Laid Open Patent Application (JP-P2006-100564A). FIG. 3 shows an enclosure 106, boards 107, electronic parts 108 mounted on the boards 107, and a thermal storrage medium 109 coated on an inner surface of the enclosure 106. According to the heat dissipating structure, heat transfer to an outer surface of the enclosure 106 in a short time can be prevented by the thermal storrage medium 109.

However, even if the heat dissipating structure is used, the thermal storrage medium reaches thermal saturation in a short time and heat stored in the medium is dissipated from the outer surface of the enclosure for a long time. Consequently, a user feels discomfort.

DISCLOSURE OF INVENTION

An object of the present invention is to provide a heat dissipating structure and a portable device which enables that heat is dissipated from a heat generating part without causing a user to feel discomfort.

A heat dissipating structure of the present invention includes a heat generating body, a heat transfer member thermally connected to the heat generating body and configured to transfer heat generated in the heat generating body, and a thermal storrage unit which is thermally connected to the heat transfer member, and thus connected to the heat generating body. The thermal storrage unit includes a pack with stretching property, and a thermal storrage medium which is filled in the pack and a volume of which changes with a change in temperature. The pack is arranged such that there is a gap between the pack and a first heat dissipating portion at normal temperature and the pack contacts the first heat dissipating portion when the thermal storrage medium expands with a change in temperature.

A portable device of the present invention includes a first enclosure, a second enclosure, and a hinge unit connecting the first enclosure and the second enclosure such that the first enclosure and the second enclosure are freely opened and closed. The first enclosure encloses a board, a heat generating body arranged on the board, and the above heat dissipating structure configured to dissipate heat generated in the heat generating body.

According to the present invention, there are provided a heat dissipating structure and a portable device which enable that heat is dissipated from a heat generating part without causing a user to feel discomfort.

BEST MODE FOR CARRYING OUT THE INVENTION

First Exemplary Embodiment

Figure 1:
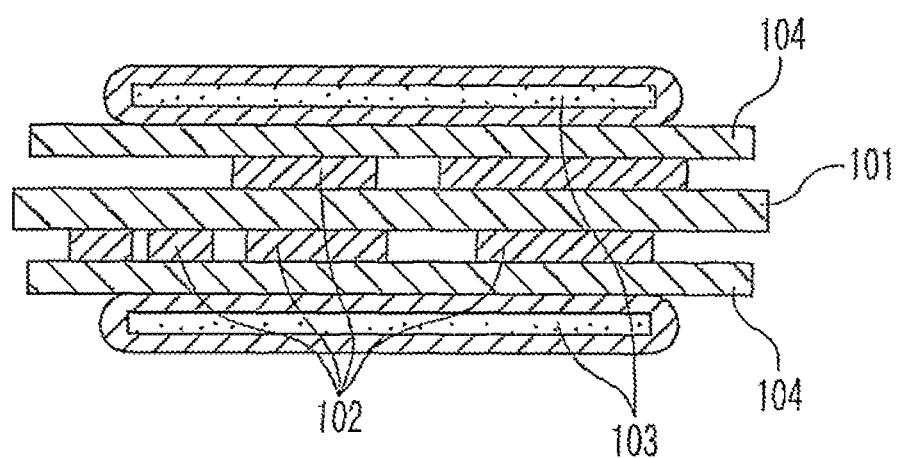
FIG. 1 is a cross sectional view of a heat dissipating structure.
Figure 2:
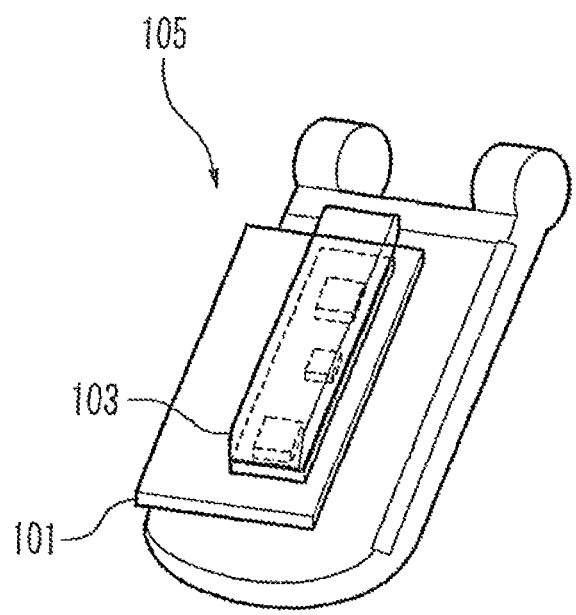
FIG. 2 is an explanatory diagram of the heat dissipating structure.
Figure 3:
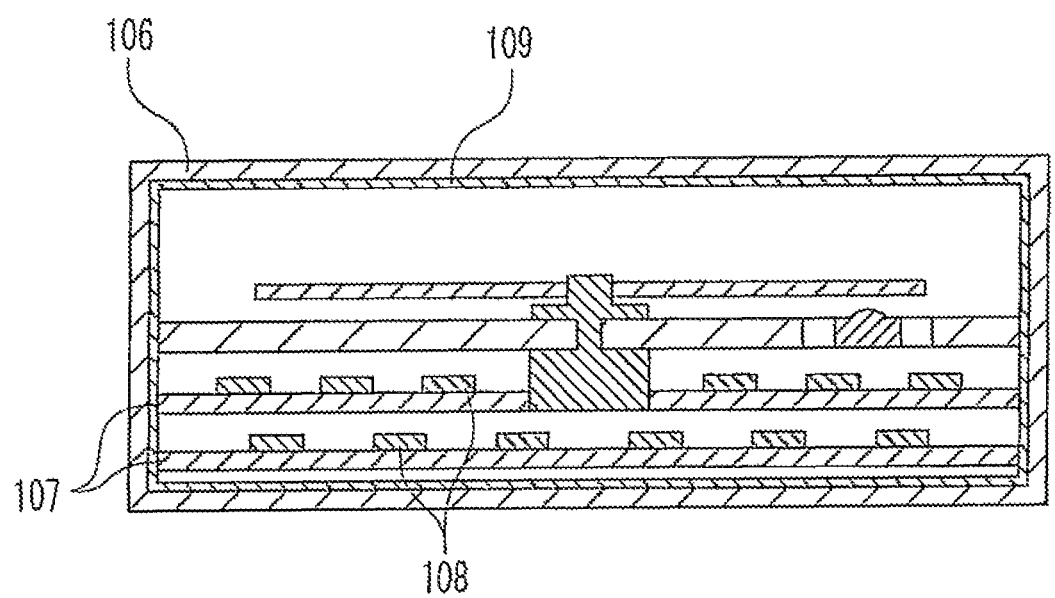
FIG. 3 is a cross sectional view of a heat dissipating structure.
Figure 4A:
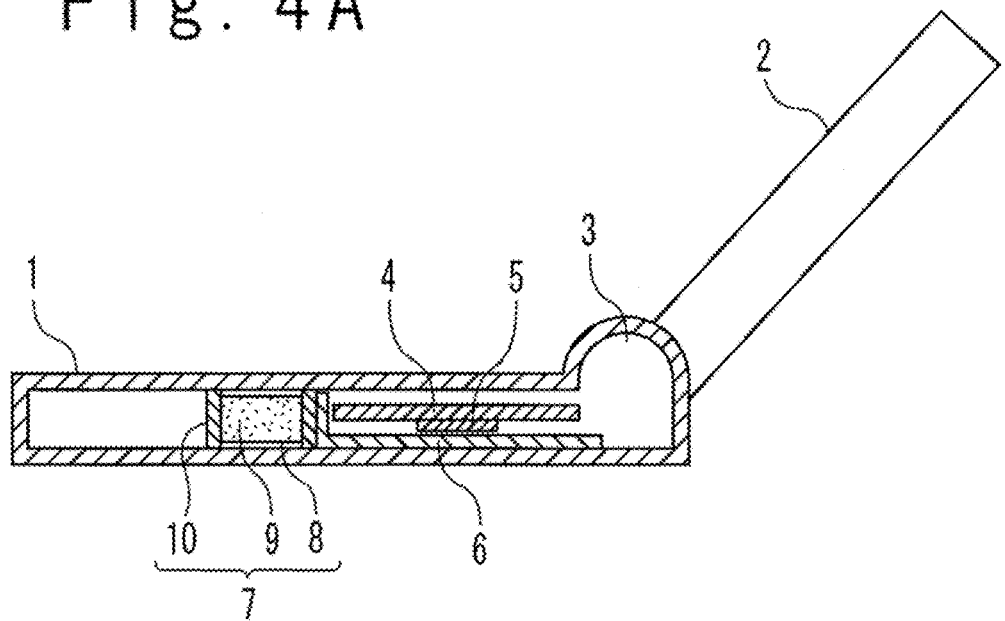
FIG. 4A is a cross sectional view of a heat dissipating structure according to a first exemplary embodiment.
Figure 4B:
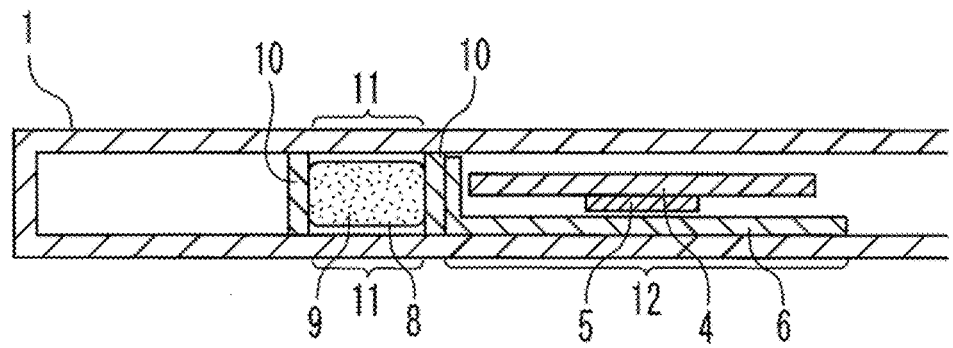
FIG. 4B is an explanatory diagram showing an enlarged main portion of FIG. 4A.

A first exemplary embodiment of the present invention will be explained in detail referring to drawings. FIG. 4A is a cross sectional view schematically showing an internal structure of a portable device according to the present exemplary embodiment. FIG. 4B shows an enlarged main portion of FIG. 4A. The portable device according to the present exemplary embodiment is a portable phone including a first enclosure 1 and a second enclosure 2 which are connected by a hinge unit 3 such that the enclosures are freely opened and closed. The first enclosure includes an opposite side of the hinge unit 3. It is supposed that a user is usually holds the first enclosure 1 on the opposite side when the portable phone is used. In the following explanation, a "thickness direction" may means a thickness direction of the first enclosure 1 and a "plane direction" means a direction along a plane orthogonal to the thickness direction.

The first enclosure 1 encloses a board 4, a semiconductor chip 5, a heat transfer member 6 and a thermal storrage unit 7.

The semiconductor chip 5 is mounted on the board 4 and generates heat when the portable phone operates for conversation or the like.

The first enclosure includes a side of hinge unit 3. The heat transfer member 6 is arranged to be in contact with an inner wall of the enclosure 1 in the side of hinge unit 3. The possibility is low that the user holds a portion of the first enclosure 1, which is in contact with the heat transfer member 6. The heat transfer member 6 is bent on its end portion opposite to the hinge unit 3 at 90 degrees in the thickness direction of the first enclosure 1. A portion of the heat transfer member 6 is arranged near the semiconductor chip 5 and faces the semiconductor chip 5 such that heat is transferred from the semiconductor chip 5 to the facing portion of the heat transfer member 6. The bent portion of the heat transfer member 6 is arranged in a position remote from the semiconductor chip 5.

As the heat transfer member 6, a graphite sheet or a metal such as copper or aluminum can be used, for example. When electrical insulation is required, the heat transfer member 6 maybe laminated by PET (polyethylene terephtalate), PEN (polyether nitrile) or the like.

The thermal storage unit 7 includes a case 10, a pack 8 and a thermal storage medium 9 filled in the pack 8. The thermal storage unit 7 is in contact with the bent portion of the heat transfer member 6 on a portion of the case 10.

As shown in FIG. 4B, the case 10 extends only in the thickness direction of the first enclosure 1 and both ends of the case 10 in the thickness direction are opened. A high heat conductivity material is preferred to be used as a material of the case 10. For example, a metal such as aluminum can be preferably used.

The pack 8 is formed wits a thin rubber-like material with stretching property. The pack 8 is bonded on the inner wall of the case 10 in the vicinity of the center of the case 10 in the thickness direction.

The thermal storrage medium 9 filled in the pack 8 is a material capable of storing heat with phase transition from solid phase to liquid phase. A volume of the material changes with the phase transition. The thermal storrage medium 9 is filled and sealed in the pack 8 without leaving a space in the pack 8. The pack 8 therefore expands or contracts with a volume change of the thermal storrage medium 9.

The pack 8 is arranged such that there is gaps between the open ends of the case 10 (i.e. inner walls of the first enclosure 1) and the pack 8 at normal temperature. The pack 8 is also arranged such that the pack 8 contacts the inner walls of the first enclosure 1 when the thermal storrage medium 9 expands with the phase transition. The gaps between the inner walls of the first enclosure 1 and the pack 8 can be set to desired widths by adjusting a volume of the thermal storrage medium 9 to be filled in the pack 8, for example.

A material with stretching property and heat resistance, such as Teflon (registered mark) or silicone, is preferred to be used as a material of the pack 8. A thickness of the pack 8 is preferred to be 0.1 mm or less to ensure stretching property.

A paraffinic material can be used as the thermal storage medium 9, for example. More specifically, n-nonadecane with a phase transition temperature of about 33 C°, a latent heat of fusion of 170 J/g, and a volume change amount of about 10% with phase transition can be exemplified.

Operation of the portable phone will be described below.

During conversation or communication, the user usually holds the first enclosure 1 on the opposite side of the hinge unit 3 as shown in FIG. 4A. During conversation or communication, the semiconductor chip 5 operates and generates heat. The heat generated in the semiconductor chip 5 is transferred to the heat transfer member 6 and diffuses therein. The heat transferred to the heat transfer member 6 is transferred to the portion (a second heat dissipating portion 12, refer to FIG. 4B) of the first enclosure 1, which is in contact with the heat transfer member 6 and the heat is dissipated from an outer surface of the second heat dissipating portion 12. Therefore, the enclosure is prevented from having a locally high surface temperature. At this time, since the second heat dissipating portion 12 is arranged in the side of the hinge unit 3, the heat dissipating portion is less likely held by the user and the user does not feel discomfort.

In the heat transfer member 6, heat which is not dissipated from the second heat dissipating portion 12 is transferred from the bent portion to the pack 8 via the case 10 and storred in the thermal storrage medium 9. When the portable phone is continued to be used and the temperature of the thermal storrage medium 9 reaches its phase transition temperature, energy is consumed in the phase transition of the thermal storrage medium 9 and heat is storred at a constant temperature for a period of time. When it is given that an amount of the thermal storage medium 9 in the pack 8 is 2 g, heat generated in the semiconductor chip 5 is 0.5 W, and heat not dissipated from the second dissipating portion 12 but storred in the thermal storrage medium 9 is 0.1 W, temperature rise of the enclosure is suppressed for about 1 hour by thermal storrage with the phase transition.

Figure 5:
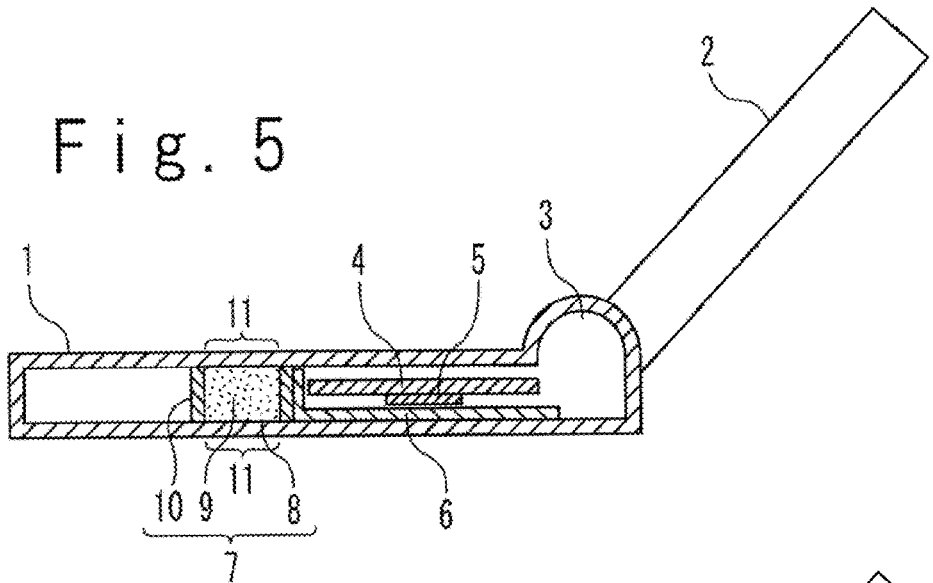
FIG. 5 is a cross sectional view of the heat dissipating structure according to the first exemplary embodiment.

When the portable phone is further continued to be used, as shown in FIG. 5, the thermal storrage medium 9 expands with the phase transition of the thermal storrage medium 9. The pack 8 is therefore contacts the inner walls of the first enclosure 1. As a result, heat is transferred from the thermal storrage medium 9 to the first enclosure 1 via a contact portion (a first heat dissipating portion 11) of the inner wall of the first enclosure 1, which is in contact with the pack 8, and the heat is dissipated from an outer surface of the first heat dissipating portion 11. That is, heat generated in the semiconductor chip 5 is dissipated from the first heat dissipating portion 11 in addition to the second heat dissipating portion 12, and therefore, the heat dissipation is accelerated. Therefore, the enclosure is prevented from having a locally high surface temperature, even when the portable phone is used for a long time. Note that an expansion of the thermal storage medium 9 in the plane direction is limited by the case 10. As a result, even when the volume change of the thermal storrage medium 9 with the phase change is small, the pack 8 certainly contacts the first heat dissipating portion 11.

After finishing conversation or communication for a long time, heat stored in the thermal storage medium 9 is dissipated and the temperature of the thermal storrage medium 9 is decreased. After the thermal storage medium 9 is cooled to reach a temperature of phase transition from liquid phase to solid phase, the thermal storrage medium 9 contracts and the pack 8 departs from the inner walls of the first enclosure 1. As a result, heat dissipation from the first heat dissipating portion 11 ends. Accordingly, heat dissipation from the first heat dissipating portion 12 does not continue for a long time after the finish of heat generation in the semiconductor chip 8. After the pack 8 departs from the first heat dissipating portion 11, heat is dissipated only from the second heat dissipating portion 12 which is less likely to be held by the user, so that the user does not feel discomfort.

Second Exemplary Embodiment

Figure 6:
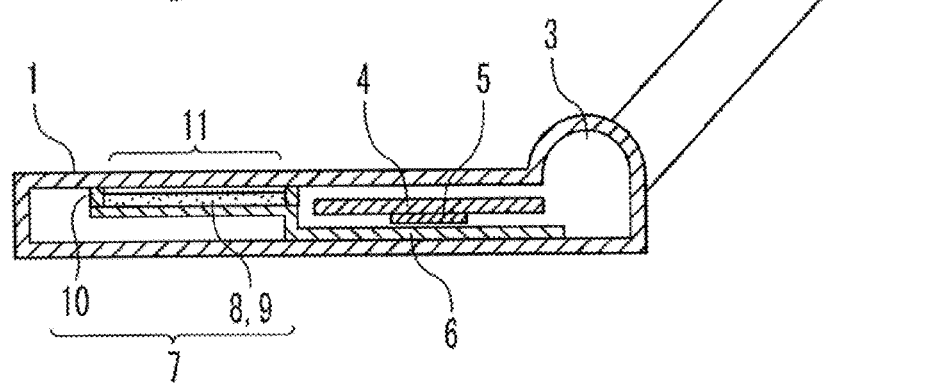
FIG. 6 is a cross sectional view of a heat dissipating structure according to a second exemplary embodiment.

Following next is explanation of a second exemplary embodiment. FIG. 6 is a cross sectional view showing a structure of a portable phone according to the present exemplary embodiment. In the present exemplary embodiment, structures of the heat transfer member 6 and the thermal storrage unit 7 are modified in comparison with the first exemplary embodiment. The other features are same as those of the first exemplary embodiment and detailed explanation thereof will be omitted.

As shown in FIG. 6, the heat transfer member 6 is bent on its opposite side of the hinge unit 3 at 90 degrees in the thickness direction, is further bent at 90 degrees at ahead of the bent, and then extends toward the Opposite side of the hinge unit 3. Therefore, the heat transfer member 6 is not in contact with the inner wall of the first enclosure 1 in the opposite side of the hinge unit 3. Hereinafter, a portion of the heat transfer member 6, which is not in contact with the first enclosure and extends in the plane direction, is referred to as a floating portion.

The thermal storrage unit 7 is arranged to be in contact with the floating portion of the heat transfer member 6. The thermal storrage unit 7 includes the case 10 and the pack 8 filled with the thermal storrage medium 9.

The case 10 is arranged on the floating portion. The case 10 has an open end on a side of the heat transfer member 6 and an open end on a side of the inner wall of the first enclosure 1.

The pack 8 is bonded on and fixed to the case 10. The pack 8 is arranged such that there is a gap between the pack 8 and the inner wall of the first enclosure 1 when the thermal storage medium 9 is in solid phase. Note that the pack 8 may be bonded on and fixed to the floating portion of the heat transfer member 6. The end of the case 10 on the side of the heat transfer member 6 may be closed and a bottom face of the case 10 may exist at the closed end. The thermal storrage unit 7 may be arranged on an inner surface side (an internal side in opening and closing of the portable phone) or an outer surface side (an outer side in opening and closing of the portable phone) of the floating portion.

Also in the present exemplary embodiment, as same as the first exemplary embodiment, after the thermal storrage medium 9 reaches the phase transition temperature, the thermal storrage medium 9 expands to bring the pack 8 into contact with the inner wall (the first heat dissipating portion 11) of the first enclosure 1, and resulting in an expansion of heat dissipating area.

It is considered that mounting a larger amount of the thermal storrage medium 9 allows the thermal storage unit 7 to store a larger amount of heat. However, since the thermal storage medium 9 has heat conductivity of 1 W/mK or less in general, a small contact area between the heat transfer member 6 and the thermal storrage unit 7 limits amount of heat transferred from the heat transfer member 6 to the thermal storrage unit 7 per unit time. In contrast, according to the structure of the present exemplary embodiment, since the portion of the heat transfer member 6 extends while floating with respect to the inner wall of the first enclosure 1, the thermal storrage unit 7 can be in contact with the floating portion of the heat transfer member 6 at a wide area. As a result, the amount of heat transferred from the heat transfer member 6 to the thermal storrage unit 7 per unit time can be increased.

Third Exemplary Embodiment

Figure 7:
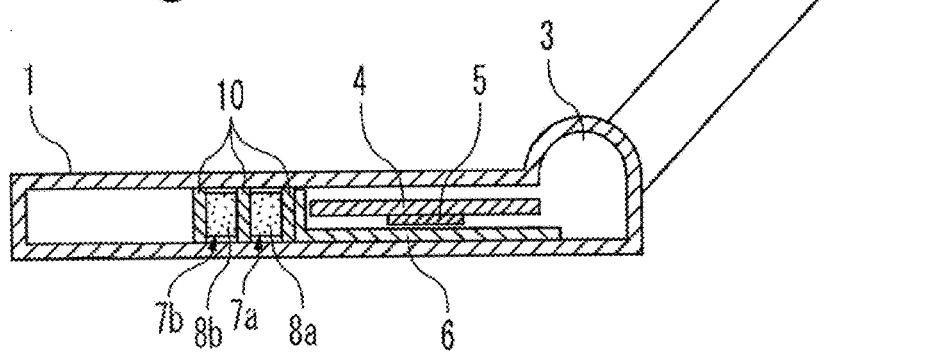
FIG. 7 is a cross sectional view of a heat dissipating structure according to a third exemplary embodiment.

Following next is explanation of a third exemplary embodiment. FIG. 7 is a cross sectional view showing a structure of a portable phone according to the present exemplary embodiment . In the present exemplary embodiment, a structure of the thermal storrage unit 7 is modified in comparison with the first exemplary embodiment. The other features are same as those of the first exemplary embodiment and detailed explanation thereof will be omitted.

In the present exemplary embodiment, the thermal storage unit 7 includes a plurality (two) of thermal storrage elements (7a and 7b). Each of the plurality of the thermal storrage elements 7 includes the case 10 and the pack (8a or 8b) filled with the thermal storrage medium.

A portion of the case 10 is in contact with the bent portion of the heat transfer member 6. Another portion of the case 10 is arranged to separate the thermal storage elements 7a and 7b from each other. The thermal storage element 7a is arranged nearer to the heat transfer member 6 than the thermal storage member 7b.

The case 10 has two open ends in the thickness direction. The packs 8a and 8b are bonded on and fixed to around of center portion of the case 10 in the thickness direction. The packs 8a and 8b are arranged such that there are gaps between the packs 8a and 8b and the inner walls (the first heat dissipating portion 11) of the first enclosure 1 when the thermal storrage medium 9 is in solid phase and such that the packs 8a and 8b are in contact with the first heat dissipating portion 11 when the thermal storrage medium 9 is in liquid phase.

In the present exemplary embodiment, as same as the aforementioned exemplary embodiment, when heat is stored in the thermal storrage unit 7, the pack 8a and 8b of the respective thermal storrage elements 7a and 7b expand to contacts the first heat dissipating portion 11. Therefore, heat is dissipated from the first heat dissipating portion 11 in addition to the second heat dissipating portion 12, thereby preventing the enclosure from having a locally high temperature.

As described in the second exemplary embodiment, it is considered that mounting a large amount of the thermal storrage medium 9 allows the thermal storrage unit 7 to store a larger amount of heat. However, since the thermal storage medium 9 has heat conductivity of 1 W/mK or less in general, amount of heat transferred from the heat transfer member 6 to the thermal storrage unit 7 per unit time is limited. In contrast, according to the structure of the present exemplary embodiment, since the thermal storrage elements 7a and 7b are connected via the case 10 having high heat conductivity, heat transfer in the plane direction is enhanced in the thermal storrage unit 7. The amount of heat transferred from the heat transfer member 6 to the thermal storrage unit 7 per unit time can be increased and amount of heat stored in the thermal storrage unit 7 can be substantially increased.

The first to third exemplary embodiments have been explained above, and those may be combined as necessary in a range without contradiction. For example, the thermal storrage unit 7 according to the second exemplary embodiment may be configured to include a plurality of thermal storrage elements as described in the third exemplary embodiment.

The invention claimed is:

1. A heat dissipating structure comprising:
a heat generating body;
a heat transfer member thermally connected to said heat generating body and configured to transfer heat generated in said heat generating body; and
a thermal storage unit thermally connected to said heat transfer member,
wherein said thermal storage unit includes:
a pack with stretching property; and
a thermal storage medium which is filled in said pack and a volume of which changes with a change in temperature,
said pack is arranged such that there is a gap between said pack and a first heat dissipating portion at normal temperature and said pack contacts said first heat dissipating portion when said thermal storage medium expands with a change in temperature,
said heat transfer member is in contact with a second heat dissipating portion a location of which is different from a location of said first heat dissipating portion,
the heat transfer member is configured to dissipate heat via said second heat dissipating portion,
said heat transfer member and said thermal storage unit are arranged in a first enclosure of a portable device in which said first enclosure and second enclosure are connected via a hinge unit such that said first enclosure and said second enclosure are freely opened and closed,
said first enclosure includes a side of said hinge unit and an opposite side of said hinge unit,
said first heat dissipating portion is a portion of said opposite side of said hinge unit, and
said second heat dissipating portion is arranged in said side of said hinge unit.

2. The heat dissipating structure according to claim 1, wherein
said opposite side of said hinge unit is farther from said hinge unit than said side of said hinge unit.

3. The heat dissipating structure according to claim 1, wherein said heat transfer member and said pack are bonded at least partially to one another.

4. The heat dissipating structure according to claim 1, wherein said thermal storage unit further includes a case configured to limit an expansion direction of said pack such that said pack expands toward said first heat dissipating portion.

5. The heat dissipating structure according to claim 4, wherein said case is made of metal.

6. The heat dissipating structure according to claim 4, wherein said thermal storage unit includes a plurality of thermal storage elements, and
said plurality of thermal storage elements are separated from each other by said case.

7. The heat dissipating structure according to claim 1, wherein said thermal storage medium is a material a volume of which changes with phase transition from solid phase to liquid phase.

8. The heat dissipating structure according to claim 7, wherein said thermal storage medium includes a paraffinic material.

9. The heat dissipating structure according to claim 1, wherein
said first heat dissipating portion is a portion of an inner wall of said first enclosure.

10. A portable device comprising:
a first enclosure;
a second enclosure; and
a hinge unit connecting said first enclosure and said second enclosure such that said first enclosure and said second enclosure are freely opened and closed, and
wherein said first enclosure encloses:
a board;
a heat generating body arranged on said board; and
the heat dissipating structure according to claim 1, which is configured to dissipate heat generated in said heat generating body,
said first enclosure includes a side of said hinge unit and an opposite side of said hinge unit,
said first heat dissipating portion is a portion of said opposite side of said hinge unit, and
said second heat dissipating portion is arranged in said side of said hinge unit.

* * * * *